(12) United States Patent
Yuuki

(10) Patent No.: US 10,145,745 B2
(45) Date of Patent: Dec. 4, 2018

(54) BONDING METHOD FOR THREE-LAYER SUBSTRATE

(71) Applicant: Azbil Corporation, Tokyo (JP)

(72) Inventor: Kouji Yuuki, Tokyo (JP)

(73) Assignee: Azbil Corporation, Tokyo (JP)

( * ) Notice: Subject to any disclaimer, the term of this patent is extended or adjusted under 35 U.S.C. 154(b) by 344 days.

(21) Appl. No.: 15/015,693

(22) Filed: Feb. 4, 2016

(65) Prior Publication Data

US 2016/0229169 A1   Aug. 11, 2016

(30) Foreign Application Priority Data

Feb. 9, 2015   (JP) .................. 2015-022944

(51) Int. Cl.
| | |
|---|---|
| B32B 38/00 | (2006.01) |
| G01L 1/00 | (2006.01) |
| B32B 37/18 | (2006.01) |
| G01L 9/00 | (2006.01) |
| B32B 17/06 | (2006.01) |
| B32B 37/00 | (2006.01) |

(52) U.S. Cl.
CPC ............. *G01L 1/00* (2013.01); *B32B 17/06* (2013.01); *B32B 37/18* (2013.01); *G01L 9/0048* (2013.01); *B32B 2037/0092* (2013.01); *B32B 2315/08* (2013.01); *B32B 2457/00* (2013.01)

(58) Field of Classification Search
CPC ......... G01L 1/00; G01L 9/0048; B32B 17/06; B32B 37/18
See application file for complete search history.

(56) References Cited

U.S. PATENT DOCUMENTS

| | | | |
|---|---|---|---|
| 6,475,326 B2* | 11/2002 | Gross | B32B 37/00 156/272.2 |
| 2013/0068165 A1* | 3/2013 | Forrest | C23C 14/12 118/733 |

FOREIGN PATENT DOCUMENTS

| | | |
|---|---|---|
| JP | 2009-135190 A | 6/2009 |
| JP | 2010-143792 A | 7/2010 |
| JP | 2012-141285 A | 7/2012 |

OTHER PUBLICATIONS

Japanese Application No. 2015-022944, filed Feb. 9, 2015.
Japan Patent Office, "Office Action", issued in Japanese Patent Application No. 2015-022944, which is a Japanese counterpart of U.S. Appl. No. 15/015,693, dated Sep. 19, 2017, 5 pages (2 pages of English Translation of Office Action and 3 pages of Office Action).

* cited by examiner

*Primary Examiner* — Daniel McNally
(74) *Attorney, Agent, or Firm* — Amster, Rothstein & Ebenstein LLP

(57) ABSTRACT

To facilitate the anodic bonding of individual layers without precipitation of movable ions in a three-layer structure interposing a glass substrate such as a silicon-glass-silicon structure, an anodic bonding condition for a sensor chip and a glass substrate in a secondary anodic bonding process is made weaker than an anodic bonding condition for a silicon tube and the glass substrate in a primary anodic bonding process. The secondary anodic bonding process is completed before movable ions in the glass substrate that have been attracted to a part of the glass substrate close to a cathode in the primary anodic bonding process reach a bonded surface between the glass substrate and the silicon tube in the secondary anodic bonding process.

2 Claims, 4 Drawing Sheets

(a)

(b)

BONDING METHOD FOR THREE-LAYER SUBSTRATE

CROSS-REFERENCE TO RELATED APPLICATION

The present application claims the benefit of and priority to Japanese Patent Application No. 2015-022944, filed on Feb. 9, 2015, the entire contents of which are incorporated herein by reference.

TECHNICAL FIELD

The present invention relates to a bonding method for a three-layer substrate configured by interposing a glass substrate.

BACKGROUND ART

As an example of a three-layer substrate configured to interpose a glass substrate, there is a conventional pressure sensor of a three-layer structure including a sensor chip (silicon substrate), a glass base, and a silicon tube. In the pressure sensor of the three-layer structure, the sensor chip, the glass base, and the silicon tube are bonded to each other by anodic bonding (see PTL 1, for example).

Anodic bonding is a direct bonding method that does not interpose a third material between bonded members. When glass including movable ions (metal positive ions such as $Na^+$ or $K^+$) is laminated with silicon or metal and high temperature and high voltage are applied, an electrostatic attraction is exerted on the interface, covalent bonding occurs, and both members are bonded to each other. This technique is used to bond a sensor chip, glass base, and silicon tube to each other to obtain a pressure sensor of a three-layer structure. The heating temperature at which the bonded part is heated during anodic bonding is referred to as the bonding temperature.

[First Anodic Bonding (Primary Anodic Bonding)]

First, as illustrated in FIG. 3, a glass base 12 is superposed on a silicon tube 13, the upper surface of the glass base 12 is connected to the negative electrode (cathode) and the lower surface of the silicon tube 13 is connected to the positive electrode (anode), and a high voltage is applied when the bonding temperature is reached to perform anodic bonding between the glass base 12 and the silicon tube 13. This forms a bonded body (glass base/silicon tube bonded body) 14 of the glass base 12 and the silicon tube 13.

[Second Anodic Bonding (Secondary Anodic Bonding)]

Next, as illustrated in FIG. 4, a sensor chip (silicon substrate) 11 is superposed on the glass base/silicon tube bonded body 14 and the upper surface of the sensor chip 11 is connected to the positive electrode (anode), the lower surface (lower surface of the silicon tube 13) of the glass base/silicon tube bonded body 14 is connected to the negative electrode (cathode), and a high voltage is applied when the bonding temperature is reached to perform anodic bonding between the sensor chip 11 and the glass base/silicon tube bonded body 14. This forms a bonded body (sensor chip/glass base/silicon tube bonded body) 15 of the sensor chip 11 and the glass base/silicon tube bonded body 14 and provides a pressure sensor 200 of a three-layer structure.

As a method for manufacturing the pressure sensor 200, there is a method that bonds a wafer (sensor chip wafer) in which a plurality of sensor chips 11 are created, a wafer (glass base wafer) in which a plurality of glass bases 12 are created, and a wafer (silicon tube wafer) in which a plurality of silicon tubes 13 are created to form a bonded body having the three wafers, cuts the bonded body having the three wafers using dicing, and obtains a plurality of pressure sensors 200 in order to efficiently manufacture many pressure sensors 200.

PRIOR ART DOCUMENTS

Patent Documents

[PTL 1] JP-A-2009-135190
[PTL 2] JP-A-2010-143792

SUMMARY OF THE INVENTION

Problems to be Solved by the Invention

However, when primary anodic bonding and secondary anodic bonding are performed by applying voltages in mutually opposite directions concentrically (about the axis passing through the three-layer structure), after movable ions ($Na^+$ and $K^+$) move in primary anodic bonding (see FIG. 5(a)), a depletion layer of movable ions is generated in the vicinity of the bonded surface (primary bonded surface) between the glass base 12 and the silicon tube 13, movable ions ($Na^+$ and $K^+$) gather in the depletion layer in secondary anodic bonding (see FIG. 5(b)), sodium and the like segregate in the glass base 12, cracks are generated in the glass base 12, thereby causing reduction in the strength of the glass base 12.

PTL 2 discloses a substrate bonding method preventing peeling from occurring during application of voltages in opposite directions. In the substrate bonding method disclosed in PTL 2, anodic bonding between the first glass substrate and the silicon substrate is performed in primary anodic bonding and anodic bonding of the second glass substrate is performed on the surface of the bonded body between the first glass substrate and the silicon substrate close to the silicon substrate in secondary anodic bonding. At this time, the resistances of the first glass substrate and the second glass substrate are changed, so that secondary anodic bonding is completed while the movable ions attracted to the part of the first glass substrate close to the cathode in primary anodic bonding move to the ion depletion layer generated on the part of the first glass substrate close to the bonded surface in secondary anodic bonding.

However, the substrate bonding method disclosed in PTL 2 is applicable only to the bonding of a glass-silicon-glass three-layer structure and the available glass type is limited since the resistances of the first glass substrate and the second glass substrate need to be changed.

The invention addresses the above problems with an object of providing a bonding method for a three-layer substrate that can easily perform the anodic bonding of the individual layers without precipitation of movable ions in a three-layer structure interposing a glass substrate such as a silicon-glass-silicon structure.

Means for Solving the Problems

To achieve the above object, according to the invention, there is provided a bonding method for a three-layer substrate, the method including a primary anodic bonding process for performing anodic bonding between one surface of a glass substrate and a first substrate by connecting the first substrate to an anode and the glass substrate to a cathode and a secondary anodic bonding process for performing anodic bonding between a second substrate and another surface of the glass substrate by connecting a bonded body of the first substrate and the glass substrate bonded in the primary anodic bonding process to a cathode and the second substrate to an anode, in which an anodic bonding condition for the second substrate and the glass substrate in the secondary anodic bonding process is weaker than an anodic bonding condition for the first substrate and the glass substrate in the primary anodic bonding process so that the secondary anodic bonding process is completed before movable ions in the glass substrate that have been attracted to a part of the glass substrate close to the cathode in the primary anodic bonding process reach a bonded surface between the glass substrate and the first substrate in the secondary anodic bonding process.

In the invention, the first substrate and the second substrate are assumed to be silicon substrates, but they may be metal substrates. In addition, the anodic bonding condition in the secondary anodic bonding process is weaker than the anodic bonding condition in the primary anodic bonding process in the invention, but each of the anodic bonding conditions may include an applied voltage and a bonding temperature.

When each of the anodic bonding conditions includes an applied voltage and a bonding temperature, the anodic bonding condition in the secondary anodic bonding process may be made weaker than the anodic bonding condition in the primary anodic bonding process by making one of the applied voltage and the bonding temperature in the secondary anodic bonding process lower than the applied voltage and the bonding temperature in the primary anode bonding process in the secondary anodic bonding process or making both the applied voltage and the bonding temperature in the secondary anodic bonding process lower than the applied voltage and the bonding temperature in the primary anodic bonding process.

Advantage of the Invention

According to the invention, since the anodic bonding condition for the second substrate and the glass substrate in the secondary anodic bonding process is weaker than the anodic bonding condition for the first substrate and the glass substrate in the primary anodic bonding process so that the secondary anodic bonding process is completed before movable ions in the glass substrate that have been attracted to the part of the glass substrate close to the cathode in the primary anodic bonding process reach the bonded surface between the glass substrate and the first substrate in the secondary anodic bonding process, anodic bonding of individual layers can be performed without precipitation of movable ions in a three-layer structure interposing the glass substrate such as a silicon-glass-silicon structure.

MODE FOR CARRYING OUT THE INVENTION

An embodiment of the invention will be described in detail with reference to the drawings.

Figure 1:
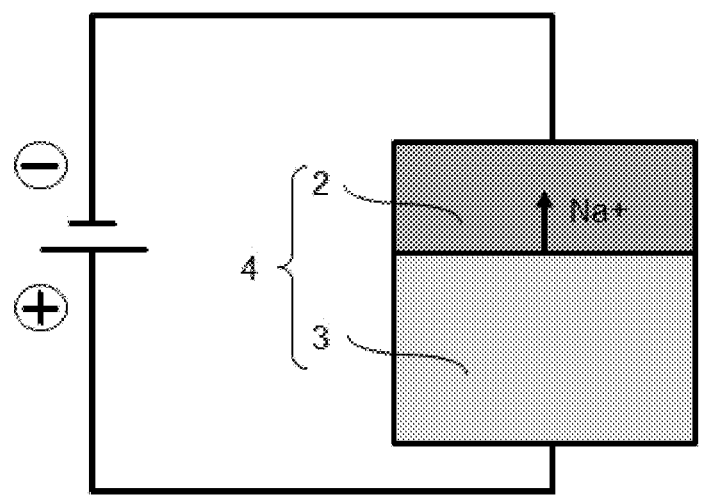
FIG. 1 illustrates the principle of a bonding method for a three-layer substrate according to the invention.
Figure 1:
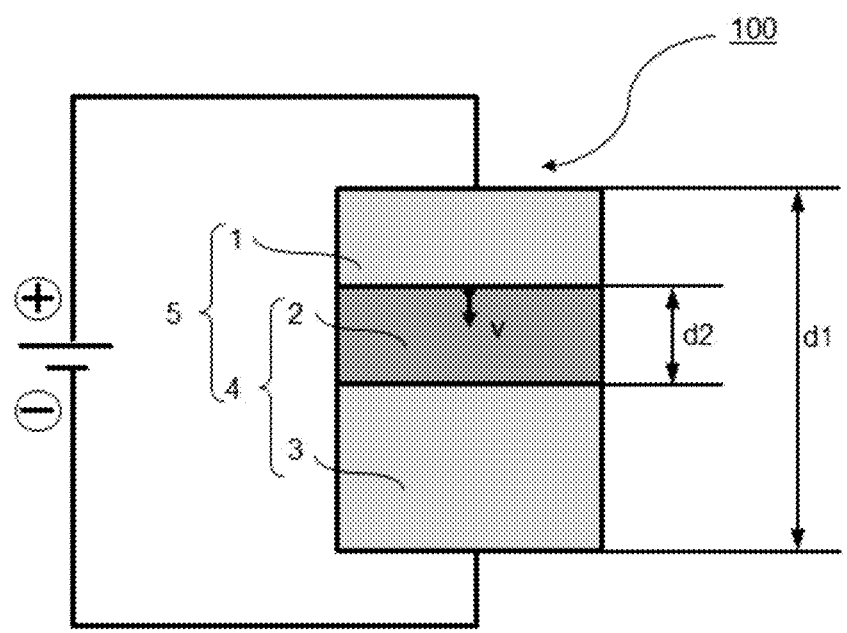

First, referring to FIG. 1, the principle of a bonding method for a three-layer substrate according to the invention will be described. In FIG. 1, reference numeral 1 indicates a sensor chip (silicon substrate), reference numeral 2 indicates a glass base, and reference numeral 3 indicates a silicon tube, FIG. 1(*a*) illustrates a primary anodic bonding process for manufacturing a pressure sensor 100 as a three-layer substrate, and FIG. 1(*b*) illustrates a secondary anodic bonding process.

That is, these drawings indicate the process (FIG. 1(*a*)) for forming a bonded body (glass base/silicon tube bonded body) 4 of the glass base 2 and the silicon tube 3 using primary anodic bonding and the process (FIG. 1(*b*)) for superposing the sensor chip 1 on the glass base 2 of the glass base/silicon tube bonded body 4 after that, connecting the upper surface of the sensor chip 1 to the positive electrode (anode) and the lower surface (lower surface of the silicon tube 3) of the glass base/silicon tube bonded body 4 to the negative electrode (cathode), applying a high voltage when the bonding temperature is reached, performing the anodic bonding between the sensor chip 1 and the glass base/silicon tube bonded body 4, and forming a sensor chip/glass base/silicon tube bonded body 5 (pressure sensor 100).

As a method for manufacturing the pressure sensor 100, there is a method that bonds a wafer (sensor chip wafer) in which a plurality of sensor chips 1 are created, a wafer (glass base wafer) in which a plurality of glass bases 2 are created, and a wafer (silicon tube wafer) in which a plurality of silicon tubes 3 are created to form a bonded body having the three wafers, cuts the bonded body having the three wafers using dicing, and obtains a plurality of pressure sensors 100 in order to efficiently manufacture many pressure sensors 100.

In secondary anodic bonding (FIG. 1(*b*)), since movable ions ($Na^+$ and $K^+$) in the glass base 2 have moved during primary anodic bonding, a depletion layer of movable ions is generated in the vicinity of the bonded surface (primary bonded surface) between the glass base 2 and the silicon tube 3. In secondary anodic bonding, movable ions in the glass base 2 are likely to gather in this depletion layer.

Here, a travel velocity v of the movable ions in the glass base 2 depends on an electric field E applied between the electrodes. In this case, the travel velocity v of movable ions is represented by the following expression (1) when u indicates the mobility of movable ions.

$$v = u*E \quad (1)$$

Since the above expression (1) is represented as E=V/d1 when a distance between the electrodes is d1 and an applied voltage is V, the following expression (2) holds.

$$v = u*V/d1 \quad (2)$$

Since the distance d1 between the electrodes is constant and the mobility u of movable ions is constant at a bonding temperature T, the travel velocity v of movable ions is determined by the applied voltage V. The mobility u of movable ions increases as the bonding temperature T rises.

When the voltage V is applied between the electrodes for t hours, a travel distance D of movable ions moving toward the cathode is represented by the following expression (3).

$$D = v*t \quad (3)$$

Figure 2:
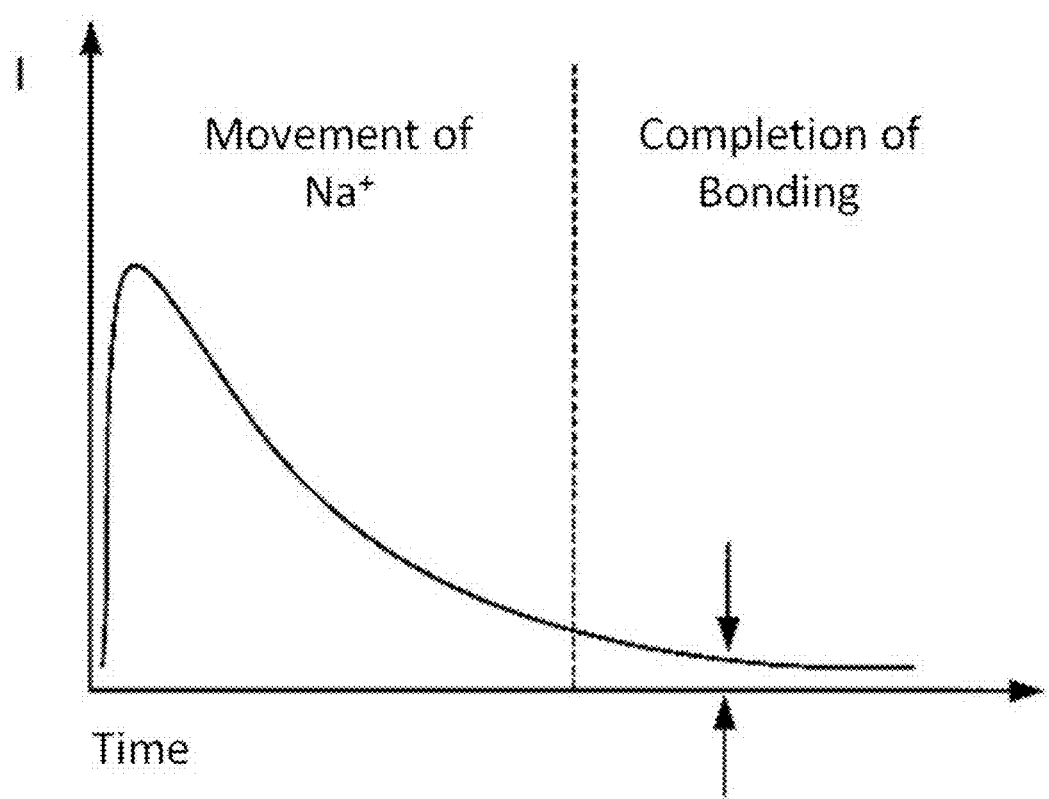
FIG. 2 illustrates how an electric current I flowing through a glass substrate reduces as a depletion layer grows.
Figure 3:
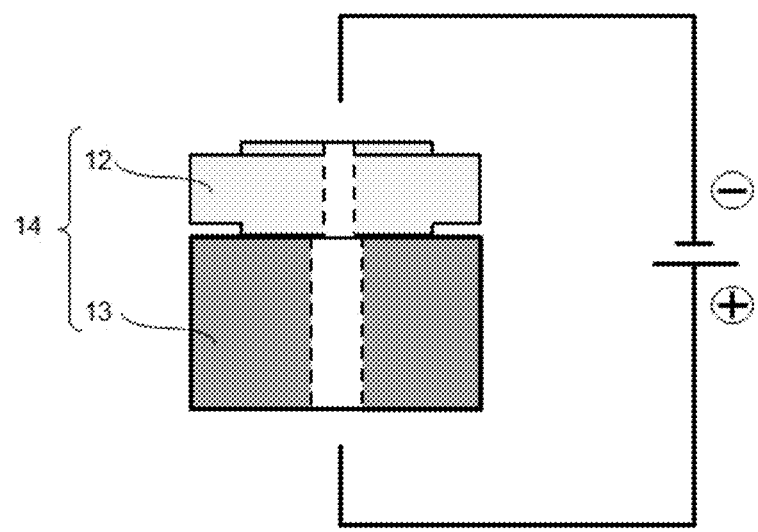
FIG. 3 illustrates a primary anodic bonding.
Figure 4:
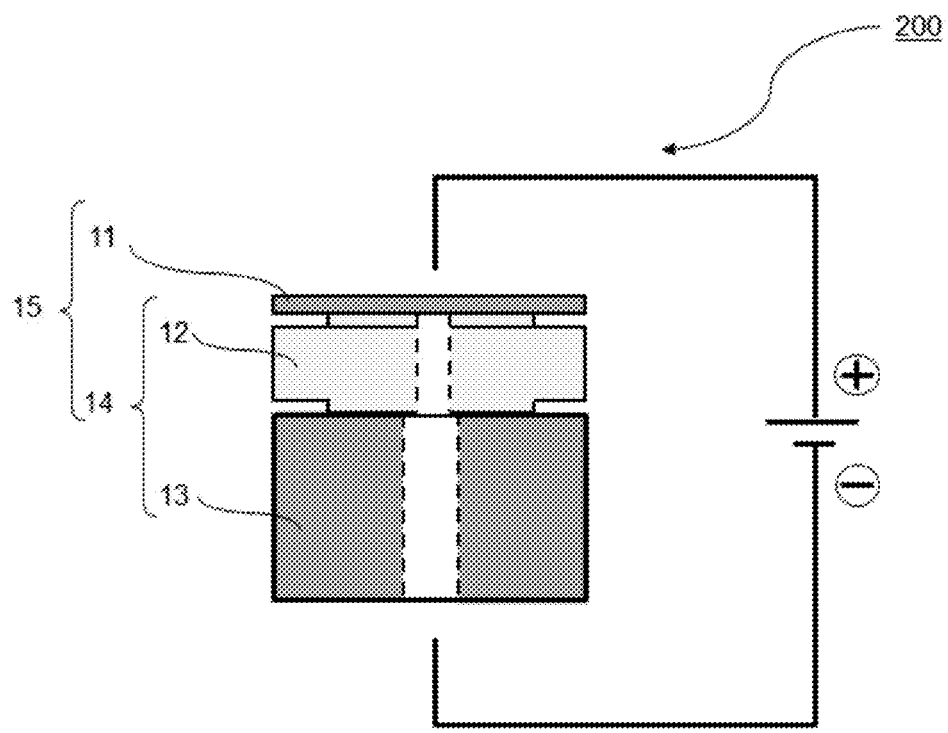
FIG. 4 illustrates a secondary anodic bonding.
Figure 5:
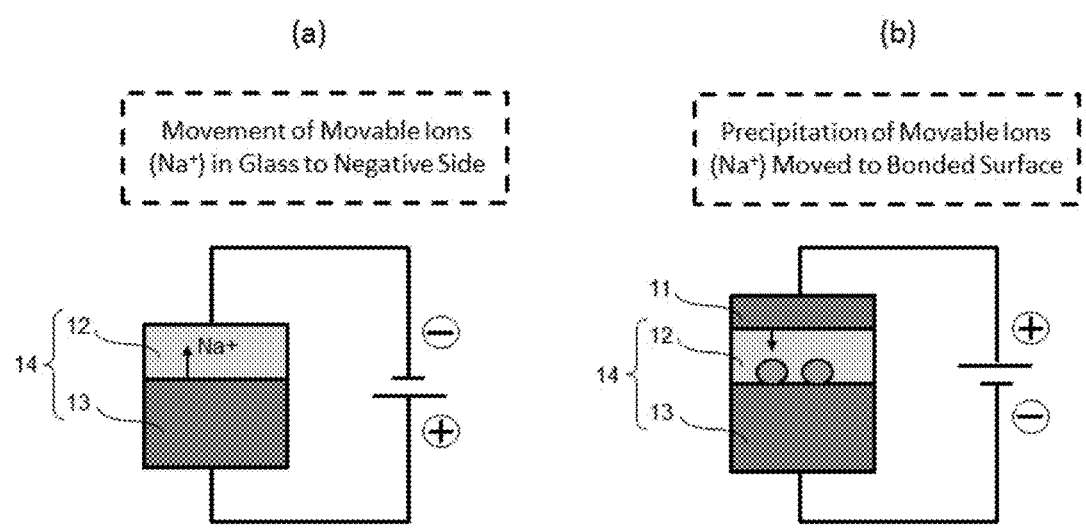
FIG. 5 illustrates how movable ions precipitate.

Movable ions in the glass in the vicinity of the bonded surface between the sensor chip 1 and the glass base 2 move toward the cathode, a depletion layer of movable ion is formed in the glass base 2 in the vicinity of the bonded surface, and an electrostatic attracting force is generated with respect to the sensor chip 1 to cause covalent bonding. The electric resistance of the depletion layer is very large as compared to that of the original glass and an electric current I flowing through the glass base 2 significantly reduces as the depletion layer grows (see FIG. 2).

Since the electric current flowing through the glass base 2 reduces when generation of a depletion layer starts, the travel velocity v of movable ions moving toward the primary bonded surface in the glass base 2 changes as the electric current changes over time.

That is, when v=f(t) holds, the travel distance D of movable ions after t hours is represented by the following expression (4).

$$D = \int_0^t f(t)dt \quad (4)$$

When a thickness of the glass is d2, to prevent movable ions from gathering in the primary bonded surface, the second anodic bonding needs to be performed on the condition that the following expression is satisfied.

$$d2 - D > 0 \quad (5)$$

that is, $$d2 > \int_0^t f(t)dt \quad (6)$$

In addition, since movable ions move away from the primary bonded surface in primary anodic bonding, when the travel distance in secondary anodic bonding is smaller than that in primary anodic bonding, movable ions do not precipitate.

Here, when a travel distance of movable ions in primary anodic bonding is D1 and a travel distance of movable ions in secondary anodic bonding is D2, if anodic bonding is performed on the condition that the following expression is satisfied, movable ions do not precipitate.

$$D1 - D2 > 0 \quad (7)$$

It can be seen from the above expressions (1) to (4) that D1 and D2 depend on the bonding temperature T concerning the applied voltage V and the mobility u of movable ions.

Accordingly, when an applied voltage V1 and a bonding temperature T1 of primary anodic bonding are assumed to be the bonding condition of primary anodic bonding and an applied voltage V2 and a bonding temperature T2 of secondary anodic bonding are assumed to be the bonding condition of secondary anodic bonding, if the secondary anodic bonding condition is weaker than the primary anodic bonding condition, movable ions do not precipitate.

Since the travel distance D1 of movable ions in primary anodic bonding is equal to or less than d2, the above expression d2−D>0 is satisfied at the same time.

Base on the principle of the invention described above, in the secondary anodic bonding illustrated in FIG. 1(*b*), the secondary anodic bonding condition is made weaker than the primary anodic bonding condition in the embodiment of the invention.

For example, one of the applied voltage V2 and the bonding temperature T2 of secondary anodic bonding is made smaller than the applied voltage V1 and the bonding temperature T1 of primary anodic bonding (V2<V1 or T2<T1), so that secondary anodic bonding process is completed before the movable ions in the glass base 2 attracted to the part of the glass base 2 close to the cathode in primary anodic bonding process (FIG. 1(*a*)) reach the bonded surface between the glass base 2 and the silicon tube 3 in the secondary anodic bonding process (FIG. 1(*b*)).

Alternatively, both the applied voltage V2 and the bonding temperature T2 of secondary anodic bonding are made smaller than the applied voltage V1 and the bonding temperature T1 of primary anodic bonding (V2<V1 and T2<T1), so that the secondary anodic bonding process is completed before the movable ions in the glass base 2 attracted to the part of the glass base 2 close to the cathode in the primary anodic bonding process (FIG. 1(*a*)) reach the bonded surface between the glass base 2 and the silicon tube 3 in the secondary anodic bonding process (FIG. 1(*b*)).

Accordingly, in a three-layer structure (that is, a silicon-glass-silicon three-layer structure) including the sensor chip 1, the glass base 2, and the silicon tube 3, the anodic bonding of these layers can be performed easily without precipitation of movable ions.

In the example described with reference to FIG. 1, the glass base 2 is used as a glass substrate, the anodic bonding of the silicon tube 3 as a first substrate is performed on one surface of the glass base 2, and the anodic bonding of the sensor chip (silicon substrate) 1 as a second substrate is performed on the other surface of the glass base 2. However, the first substrate and the second substrate may be metal substrates.

In addition, it is necessary to determine the secondary anodic bonding condition before determining the primary anodic bonding condition so that the secondary anodic bonding is performed reliably. That is, the secondary anodic bonding condition for better anodic bonding is determined first and then the primary anodic bonding condition is determined so that the primary anodic bonding condition becomes stronger than the secondary anodic bonding condition. As a result, the secondary anodic bonding condition becomes weaker than the primary anodic bonding condition.

Extension of the Embodiments

Although the invention has been described above with reference to the embodiment, the invention is not limited to the above embodiment. Various changes found by those skilled in the art can be made to the structure and details of the invention within the technical spirit of the invention.

DESCRIPTION OF REFERENCE NUMERALS AND SIGNS

1: sensor chip (silicon substrate), 2: glass substrate, 3: silicon tube, 4: glass base/silicon tube bonded body, 5: sensor chip/glass base/silicon tube bonded body, 100: pressure sensor.

The invention claimed is:
1. A bonding method for a three-layer substrate, the method comprising:
    a primary anodic bonding process for performing anodic bonding between one surface of a glass substrate and a first substrate by connecting the first substrate to an anode and the glass substrate to a cathode; and
    a secondary anodic bonding process for performing anodic bonding between a second substrate and another surface of the glass substrate by connecting a bonded body of the first substrate and the glass substrate bonded in the primary anodic bonding process to a cathode and the second substrate to an anode,
    wherein one or more anodic bonding conditions for the second substrate and the glass substrate in the secondary anodic bonding process is weaker than corresponding one or more anodic bonding conditions for the first substrate and the glass substrate in the primary anodic bonding process so that the secondary anodic bonding process is completed before movable ions in the glass substrate that have been attracted to a part of the glass substrate close to the cathode in the primary anodic bonding process reach a bonded surface between the glass substrate and the first substrate in the secondary anodic bonding process; and wherein at least a secondary bonding temperature in the secondary anodic bonding process is lower than a primary bonding temperature in the primary anodic bonding process.

2. The bonding method for a three-layer substrate according to claim 1, wherein each of the anodic bonding conditions in the primary anodic bonding process and the secondary anodic bonding process further comprises at least an applied voltage, and a secondary applied voltage in the secondary anodic bonding process is lower than a primary applied voltage in the primary anodic bonding process.

* * * * *